(12) United States Patent
Shahi et al.

(10) Patent No.: US 12,437,386 B2
(45) Date of Patent: Oct. 7, 2025

(54) WELD QUALITY INSPECTION WITH DOMAIN KNOWLEDGE INFUSED ADAPTIVE-NETWORK-BASED FUZZY INFERENCE SYSTEM

(71) Applicant: Tata Consultancy Services Limited, Mumbai (IN)

(72) Inventors: Shashwat Shahi, Bangalore (IN); Shailesh Shankar Deshpande, Pune (IN); Gargi Uday Kulkarni, Bangalore (IN); Mahesh Kshirsagar, Mumbai (IN); Sonam Sharma, Noida (IN)

(73) Assignee: Tata Consultancy Services Limited, Mumbai (IN)

( * ) Notice: Subject to any disclaimer, the term of this patent is extended or adjusted under 35 U.S.C. 154(b) by 333 days.

(21) Appl. No.: 18/207,812

(22) Filed: Jun. 9, 2023

(65) Prior Publication Data

US 2023/0410281 A1    Dec. 21, 2023

(30) Foreign Application Priority Data

Jun. 13, 2022   (IN) .............................. 202221033807

(51) Int. Cl.
*G06T 7/00* (2017.01)
*G06T 7/11* (2017.01)

(52) U.S. Cl.
CPC .............. *G06T 7/0004* (2013.01); *G06T 7/11* (2017.01); *G06T 2207/20081* (2013.01); *G06T 2207/20084* (2013.01); *G06T 2207/30108* (2013.01)

(58) Field of Classification Search
CPC ................... G06T 7/0004; G06T 7/11; G06T 2207/20081; G06T 2207/20084;
(Continued)

(56) References Cited

U.S. PATENT DOCUMENTS

| 6,236,017 B1 * | 5/2001 | Smartt | B23K 31/125 |
| | | | 219/130.01 |
| 2009/0060275 A1 * | 3/2009 | Hamada | G06T 7/254 |
| | | | 382/103 |
| 2014/0085545 A1 * | 3/2014 | Tu | G06F 18/254 |
| | | | 348/E9.047 |

FOREIGN PATENT DOCUMENTS

CN          114700587 A       7/2022

OTHER PUBLICATIONS

Suthep Butdee, Jedsadarng Thanomsin, Robotic welding using fuzzy logic to predict penetration for an oil pipeline weldment, Materials Today: Proceedings, vol. 26, 2020, Part 2, pp. 2425-2431 (Year: 2020).*

* cited by examiner

*Primary Examiner* — Hwa Andrew Lee
(74) *Attorney, Agent, or Firm* — Finnegan, Henderson, Farabow, Garrett & Dunner, LLP

(57) ABSTRACT

Quality of weld images in with bad lighting condition and specific image color formats add constraints to existing automated weld inspection systems. Embodiments herein provide a method and system based on Domain Knowledge Infused Adaptive-Network-based Fuzzy Inference System (DKI-ANFIS) for weld quality inspection. The DKI-ANFIS inspects the quality of weld joint using domain driven quality inspection techniques. A segmentation algorithm is used to extract the weld joint in form of fractals followed by an unsupervised technique to extract useful geometrical features from the fractals. These geometrical features are used for quality index generation. A weld inspection model comprising the DKI-ANFIS is used for determining the quality of the weld joint. DKI-ANFIS modifies layers of ANFIS by infusing layer of domain knowledge to give better results even if there is a class imbalance in the data or the (Continued)

data is skewed or there is only a short corpus of data available.

12 Claims, 8 Drawing Sheets

(58) Field of Classification Search
CPC ............. G06T 2207/30108; G06T 7/12; G06T 2207/10024; G06T 2207/30136
See application file for complete search history.

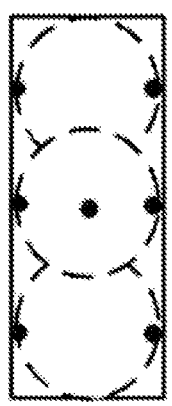
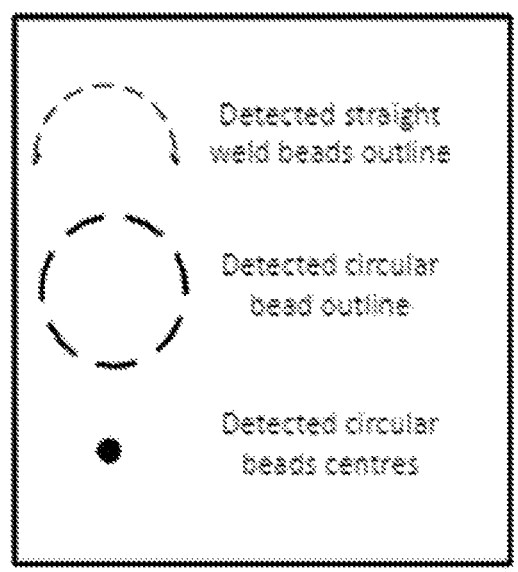
FIG. 4A  FIG. 4B

500 receiving a labeled set of a plurality of images with each of the plurality of images comprising a weld of a joint type from among the set of joint types of interest, wherein the plurality of images are labeled as a good quality weld and a bad quality weld — 502 configuring weightages to be assigned to each of a plurality of geometrical parameters for the weld of the one or more joint types, wherein the weightages are one of (i) default with equal weightages across the plurality of geometrical parameters, and (ii) customized with varying values of the weightages across the plurality of geometrical parameters — 504 preprocessing the plurality of images and marking a closed outline around the weld in each of the plurality of images — 506 segmenting each of the preprocessed plurality of images to determine a plurality of fractals of the weld, wherein pixel coordinates of the largest fractal among the plurality of fractals are identified — 508 extracting the plurality of geometrical features of the weld in accordance with the joint type using the pixel coordinates of the associated largest fractal and weighing the plurality of geometrical features of the weld in accordance with the configured weightages to introduce domain biases — 510

FIG. 5A

WELD QUALITY INSPECTION WITH DOMAIN KNOWLEDGE INFUSED ADAPTIVE-NETWORK-BASED FUZZY INFERENCE SYSTEM

PRIORITY CLAIM

This U.S. patent application claims priority under 35 U.S.C. § 119 to: Indian Provisional Patent Application No. 202221033807, filed on 13 Jun. 2022. The entire contents of the aforementioned application are incorporated herein by reference.

TECHNICAL FIELD

The disclosure herein generally relates to field of quality inspection using a computer vision, and more particularly, to a method and system for weld quality inspection based on a Domain Knowledge Infused Adaptive-Network-based Fuzzy Inference System (DKI-ANFIS).

BACKGROUND

Complete automation in industrial processes by utilizing computer vision techniques based on machine learning is currently one of major areas of research. Specifically, in welding processes quality of weld is critical in defining quality of the final product. Weld quality inspection conventionally relied on manual inspection that obviously brings in subjective aspect to predicted quality.

Existing methods and systems for welding defect detection and classification use geometrical features with radiographic images and a weld bead geometric analysis system for identification of discontinuities in weld beads. However, these existing approaches require inputs of both pre-welded and post-welded metal plates. They also require capturing the image under a green lighting condition. Procuring images of a specific type is difficult and increases the cost and complexity of the overall system. Further, it is observed that most of the existing works are focused on weld defect classification in which the type of defect is classified i.e., blowhole, cracks, porosity etc.; or weld defect detection in which an object detection model is trained to locate the defects. The limitation of such approaches is that it can only detect/classify the type of defects that the network is trained on. However, welding can be considered as an artifact where defects can arise due to several reasons such as variation in angle of torch, variation in heat emitted by the torch etc. It is not possible to obtain images of all types of defects and train model for detection/classification of each type of defect. Thus, the accuracy of quality prediction is challenging with existing approaches when in real time practical scenario weld or weld joints have unexplored unseen features.

Furthermore, specific lighting requirements of existing approaches pose a problem for processes such as welding, which may generally be carried out in varying light conditions. Thus, quality of image captured, which is to be processed for quality inspection cannot be guaranteed.

SUMMARY

Embodiments of the present disclosure present technological improvements as solutions to one or more of the above-mentioned technical problems recognized by the inventors in conventional systems. For example, in one embodiment, a method for weld quality inspection is provided. The method comprises receiving a labeled set of a plurality of images with each of the plurality of images comprising a weld of a joint type from among a set of joint types of interest, wherein the plurality of images are labeled as a good quality weld and a bad quality weld. Further, the method comprises configuring weightages to be assigned to each of a plurality of geometrical parameters for the weld of the one or more joint types. The weightages are one of (i) default with equal weightages across the plurality of geometrical parameters, and (ii) customized with varying values of the weightages across the plurality of geometrical parameters. Further, the method comprises preprocessing the plurality of images and marking a closed outline around the weld in each of the plurality of images and segmenting each of the preprocessed plurality of images to determine a plurality of fractals of the weld, wherein pixel coordinates of the largest fractal among the plurality of fractals are identified. Furthermore, the method comprises extracting the plurality of geometrical features of the weld in accordance with the joint type using the pixel coordinates of the associated largest fractal and weighing the plurality of geometrical features of the weld in accordance with the configured weightages to introduce domain biases for joint types. Further, the method comprises generating a quality index for each of the plurality of images based on the extracted plurality of geometrical features using domain knowledge in form of gold standard of a good quality weld of each joint type. Further, the method comprises encoding class labels for generated the quality index for each of the plurality of images with '0' indicating image with the bad weld quality and '1' indicating image with the good weld quality, wherein the encoded class labels serve as a training data for training the weld inspection model. Furthermore, the method comprises computing domain threshold values for each of the plurality of geometrical features associated with images encoded with class label '1' associated with good weld quality. Further, the method comprises training, a weld inspection model executed by the one or more hardware processors, for weld quality inspection to predict a confidence score of the weld of the joint type of each of the plurality of images comprising a Domain Knowledge Infused Adaptive-Network-Based Fuzzy Inference System (DKI-ANFIS). The DKI-ANFIS comprises a plurality of network layers infused with domain knowledge, wherein a first layer comprises a Weld Good Membership Function and a Weld Bad Membership Function with trainable parameters which generate a set of rules for each of the plurality of geometrical parameters. Once trained, the trained weld inspection model is used during testing for prediction of weld quality of a weld under inspection based on the extracted geometrical parameters and quality index from an input image of the weld.

In another aspect, a system for weld quality inspection is provided. The system comprises a memory storing instructions; one or more Input/Output (I/O) interfaces; and one or more hardware processors coupled to the memory via the one or more I/O interfaces, wherein the one or more hardware processors are configured by the instructions to a method for weld quality inspection is provided. The method comprises receiving a labeled set of a plurality of images with each of the plurality of images comprising a weld of a joint type from among a set of joint types of interest, wherein the plurality of images are labeled as a good quality weld and a bad quality weld. Further, the one or more hardware processors are configured to configure weightages to be assigned to each of a plurality of geometrical parameters for the weld of the one or more joint types. The weightages are one of (i) default with equal weightages across the plurality of geometrical parameters, and (ii) customized with varying values of the weightages across the plurality of geometrical parameters. Further, the one or more hardware processors are configured to preprocess the plurality of images and marking a closed outline around the weld in each of the plurality of images and segmenting each of the preprocessed plurality of images to determine a plurality of fractals of the weld, wherein pixel coordinates of the largest fractal among the plurality of fractals are identified. Furthermore, the one or more hardware processors are configured to extract the plurality of geometrical features of the weld in accordance with the joint type using the pixel coordinates of the associated largest fractal and weighing the plurality of geometrical features of the weld in accordance with the configured weightages to introduce domain biases for joint types. Further, the one or more hardware processors are configured to generate a quality index for each of the plurality of images based on the extracted plurality of geometrical features using domain knowledge in form of gold standard of a good quality weld of each joint type. Further, the one or more hardware processors are configured to encode class labels for generated the quality index for each of the plurality of images with '0' indicating image with the bad weld quality and '1' indicating image with the good weld quality, wherein the encoded class labels serve as a training data for training the weld inspection model. Furthermore, the one or more hardware processors are configured to compute domain threshold values for each of the plurality of geometrical features associated with images encoded with class label '1' associated with good weld quality. Further, the one or more hardware processors are configured to train a weld inspection model executed by the one or more hardware processors, for weld quality inspection to predict a confidence score of the weld of the joint type of each of the plurality of images comprising a Domain Knowledge Infused Adaptive-Network-Based Fuzzy Inference System (DKI-ANFIS). The DKI-ANFIS comprises a plurality of network layers infused with domain knowledge, wherein a first layer comprises a Weld Good Membership Function and a Weld Bad Membership Function with trainable parameters which generate a set of rules for each of the plurality of geometrical parameters. Once trained, the trained weld inspection model is used during testing for prediction of weld quality of a weld under inspection based on the extracted geometrical parameters and quality index from an input image of the weld.

In yet another aspect, there are provided one or more non-transitory machine-readable information storage mediums comprising one or more instructions, which when executed by one or more hardware processors causes a method for weld quality inspection is provided. The method comprises receiving a labeled set of a plurality of images with each of the plurality of images comprising a weld of a joint type from among a set of joint types of interest, wherein the plurality of images are labeled as a good quality weld and a bad quality weld. Further, the method comprises configuring weightages to be assigned to each of a plurality of geometrical parameters for the weld of the one or more joint types. The weightages are one of (i) default with equal weightages across the plurality of geometrical parameters, and (ii) customized with varying values of the weightages across the plurality of geometrical parameters. Further, the method comprises preprocessing the plurality of images and marking a closed outline around the weld in each of the plurality of images and segmenting each of the preprocessed plurality of images to determine a plurality of fractals of the weld, wherein pixel coordinates of the largest fractal among the plurality of fractals are identified. Furthermore, the method comprises extracting the plurality of geometrical features of the weld in accordance with the joint type using the pixel coordinates of the associated largest fractal and weighing the plurality of geometrical features of the weld in accordance with the configured weightages to introduce domain biases for joint types. Further, the method comprises generating a quality index for each of the plurality of images based on the extracted plurality of geometrical features using domain knowledge in form of gold standard of a good quality weld of each joint type. Further, the method comprises encoding class labels for generated the quality index for each of the plurality of images with '0' indicating image with the bad weld quality and '1' indicating image with the good weld quality, wherein the encoded class labels serve as a training data for training the weld inspection model. Furthermore, the method comprises computing domain threshold values for each of the plurality of geometrical features associated with images encoded with class label '1' associated with good weld quality. Further, the method comprises training, a weld inspection model executed by the one or more hardware processors, for weld quality inspection to predict a confidence score of the weld of the joint type of each of the plurality of images comprising a Domain Knowledge Infused Adaptive-Network-Based Fuzzy Inference System (DKI-ANFIS). The DKI-ANFIS comprises a plurality of network layers infused with domain knowledge, wherein a first layer comprises a Weld Good Membership Function and a Weld Bad Membership Function with trainable parameters which generate a set of rules for each of the plurality of geometrical parameters. Once trained, the trained weld inspection model is used during testing for prediction of weld quality of a weld under inspection based on the extracted geometrical parameters and quality index from an input image of the weld.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 4 is sample illustration of images of different joint types and fractals in the weld and processed images post segmentation for weld quality determination, in accordance with some embodiments of the present disclosure.

FIG. 5A and FIG. 5B illustrates a flow diagram of a method for DKI-ANFIS based weld quality inspection, in accordance with some embodiments of the present disclosure.

Figure 1:
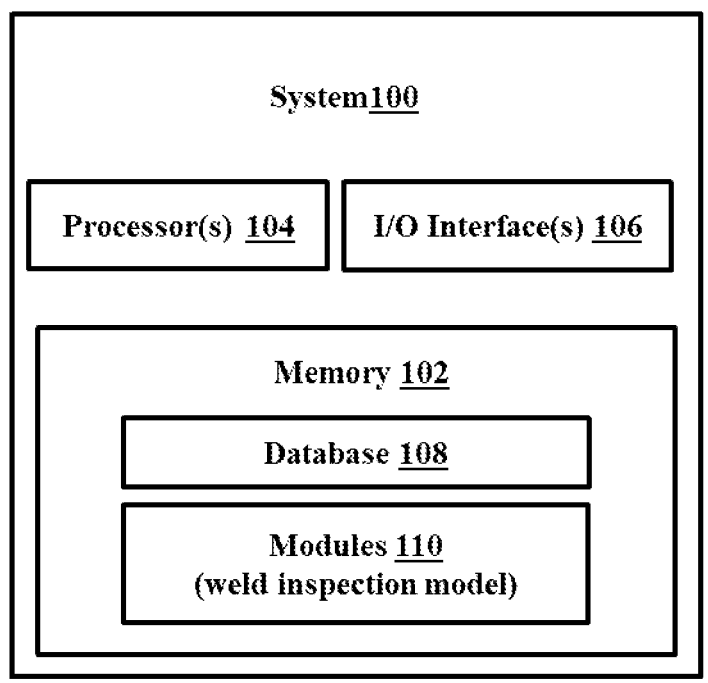
FIG. 1 is a functional block diagram of a system, interchangeably referred to as Domain Knowledge Infused Adaptive-Network-based Fuzzy Inference System (DKI-ANFIS), for weld quality inspection, in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Embodiments herein provide a method and system, interchangeably referred to as Domain Knowledge Infused Adaptive-Network-based Fuzzy Inference System (DKI-ANFIS), for weld quality inspection. The DKI-ANFIS inspects the quality of a, also referred to as a weld joint, using domain driven quality inspection techniques on captured weld joint images. The solution uses the weld joint segmentation algorithm to extract the weld joint in form of fractals and then uses an unsupervised technique to extract useful geometrical features from the fractals. These geometrical features are used for quality index generation. Further, a weld inspection model comprising Domain Knowledge Infused Adaptive-Network-based Fuzzy Inference System (DKI-ANFIS), is used for determining the quality of the weld joint. Conventional ANFIS is a class of adaptive networks that incorporate both neural networks and fuzzy logic principles. The DKI-ANFIS modifies layers of an ordinary ANFIS by infusing layer of domain knowledge to give better results than conventional ANFIS even if there is a class imbalance in the data or the data is skewed or there is only a short corpus of data available. Further, for trainable parameters in first layer of ANFIS, membership function of the conventional ANFIS is replaced with two different membership functions namely, Weld Good Membership Function and Weld Bad Membership Function. The modification in the membership function improves efficiency of the designed inference system and also reduces the computational cost, as the number of training parameters are lesser than conventional membership functions.

Chaki, Soumi et al. in their work *"Development of a hybrid learning system based on SVM, ANFIS and domain knowledge: DKFIS."* 2015 *Annual IEEE India Conference (INDICON)* (2015)" have tried to leverage domain knowledge with ANFIS, where domain knowledge used is along with some pre-existing classification algorithms to influence conventional ANFIS. However, in the method and system disclosed the ANFIS architecture is modified with domain knowledge layer to give robust results for technical challenges present in input data for welding quality inspection The system disclosed herein works irrespective of size, shape, thickness, color and intended cause (from fine grained amounting to a very precise weld to coarse grained weld) due to addition of domain knowledge layer in the ANFIS. There is no requirement of any special camera/equipment to collect input since RGB images captured by a commodity device can be used as input. Further, as understood weld can be in any region, which need not be always best illuminated. The system is trained to process low quality images captured under poor illumination to classify the weld joint in accordance with identified joint quality.

Unlike most state of the art techniques that focus mainly on anomaly detection/classification techniques in the weld joint, which are subjective, the system leverages the domain knowledge to objectively determine weld joint quality. This makes the solution disclosed herein capable enough in terms of adaptability. Existing methods restrict the type of input to certain conditions such as specific lighting, different formats such as radiographic and/or X-ray images. The system disclosed herein has no such requirements and can produce satisfactory results from usual camera captured RGB images. This reduces the overall cost and complexity and provides flexibility to the system, effectively enhancing usability in industrial applications. Furthermore, the system is configurable to any type of welding and is not limited by the size, shape, thickness, color and intended cause (from fine grained amounting to a very precise weld to coarse grained weld) and thus, it can be configured for any type of welding. This makes the system disclosed herein capable enough in terms of extensibility.

Referring now to the drawings, and more particularly to FIGS. 1 through 5B, where similar reference characters denote corresponding features consistently throughout the figures, there are shown preferred embodiments and these embodiments are described in the context of the following exemplary system and/or method.

FIG. 1 is a functional block diagram of a system 100, utilizing a weld inspection model comprising Domain Knowledge Infused Adaptive-Network-based Fuzzy Inference System (DKI-ANFIS), for weld quality inspection, in accordance with some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of the system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, personal digital assistants, and the like.

The I/O interface(s) 106 can include a variety of software and hardware interfaces, for example, a web interface, a graphical user interface and can facilitate multiple communications within a wide variety of networks N/W and protocol types including wired networks, for example, LAN, cable, etc., and wireless networks, such as WLAN, cellular, or satellite. In an embodiment, the I/O interface (s) 106 can include one or more ports for connecting a number of devices to one another or to another server or devices.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory may include a plurality of modules 110 such as a weld inspection model comprising the DKI-ANFIS.

Further, the memory 102 may include a database 108, which may store training images of various joint types. The memory 102 may comprise information pertaining to input(s)/output(s) of each step performed by the processor(s) 104 of the system 100 and methods of the present disclosure. In an embodiment, the database 108 may be external (not shown) to the system 100 and coupled via the I/O interface 106. Functions of the components of the system 100 are explained in conjunction with training and testing phase steps of FIGS. 2A through 3B and method flow diagram depicted in FIGS. 5A and 5B.

Figure 2A:
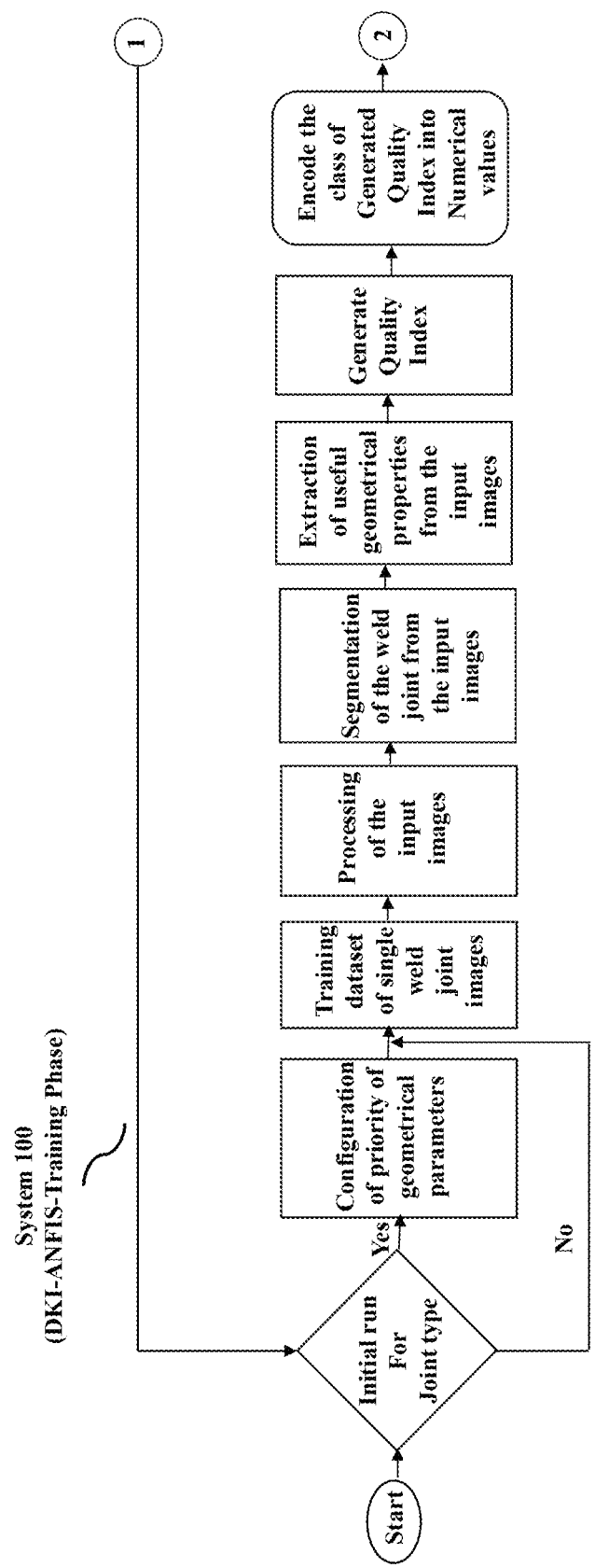
FIG. 2A and FIG. 2B illustrate the training of a weld inspection model of the system of FIG. 1, in accordance with some embodiments of the present disclosure.
Figure 2B:
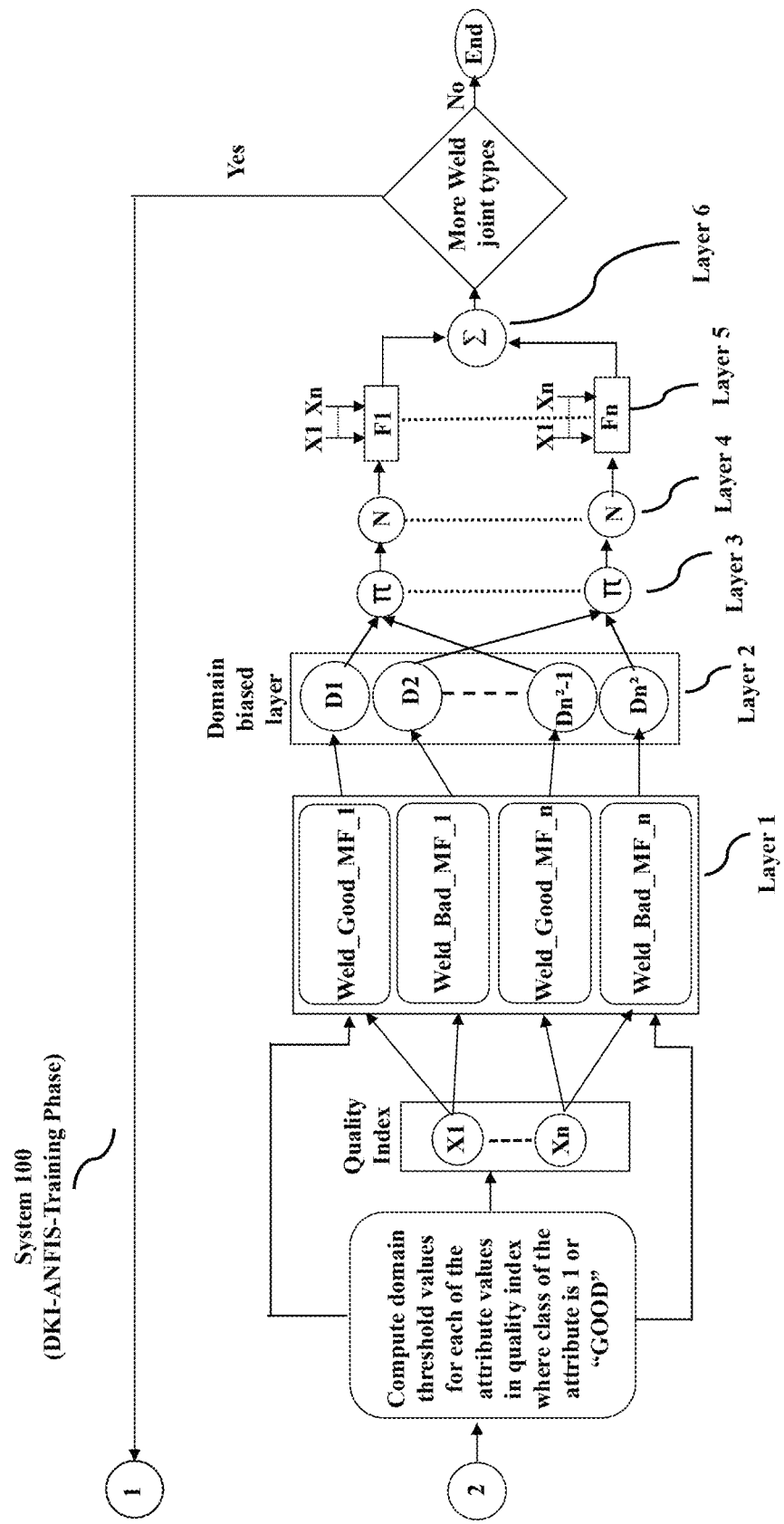

FIGS. 2A and 2B illustrate the training of the weld inspection model of the system of FIG. 1, in accordance with some embodiments of the present disclosure. As depicted in the figure?, for each joint type of interest, the weld inspection model based on DKI-ANFIS is trained using corresponding training images of the specific joint type. The weld inspection model is thus trained and customized for the joint types used in the environment of user, effectively improving classification accuracy providing robust results of a good and bad joint. Common industrial joint types include Butt joint welding, Tee joint welding, Corner joint welding, Lap joint welding, and Edge joint welding. It is understood that obtaining a large number of image examples for specific end user or customer is challenging. Thus, the system 100 is designed in such a way that even if trained on small corpus of data the system 100 can deliver objective with consistent results. Each joint type may be unique and a plurality of geometrical parameters, also referred to as geometrical parameters herein after, defines a joint type. For example, length, breadth, depth accordingly may have varying importance for a given joint type and accordingly the system needs to capture the geometrical parameters info for each joint type. Thus, for each joint type, either an entire set of default geometrical parameters are considered as is, or the end user has flexibility to update the weightage of one or more geometrical parameters based on the domain knowledge. The system can learn according to the weld joint types that the customer uses and not any additional data and thus, gives more robust results. Obtaining large number of image examples with all variations for weld types of interest is difficult for any customer. Thus, the system is designed in such a way that even when the weld inspection model is trained on small corpus of data, the system can deliver objective and consistent results. The system learns over time and generates robust result over time as each new instance of data can be used to finetune the existing inference system. The steps of training of the weld inspection model based on DKI-ANFIS are explained below:

a) Configuration stating Priority of the Geometrical Parameters that defines every joint: The default configuration of geometrical parameters is set with equal weightage given to each of the geometrical parameters. But if the End-User/Domain Subject matter expert (SME) believes that some of the geometrical parameters may be given more weightage than the others then it can be configured once for each of the weld joint type. Condition for configuring the weights is just that each weight associated with the geometrical parameter should be between 0 and 1 and sum of all the weights should be equal to 1.

b) Training dataset: A training dataset with input images labelled good and bad weld as per the design or the standards are passed into the system.

c) Preprocessing of the Images: The input images are preprocessed to highlight the region of the image containing the weld joint and ignore other regions of the input image. Preprocessing steps followed are:
Convert RGB→Grayscale
Blurring (noise removal)
Thresholding (edge differentiation)
Masking+ROI (To remove false edges)
Controlled Morphological Operations—(To forma clued outline of the weld)

d) Segmentation of the Weld Joints from the Input Images: After the preprocessing of the input, the weld joint segmentation algorithm is used to segment the weld joint from the input images. The main steps followed in the weld joint segmentation algorithm are as follows:
Edge detection—Canny Edge is used to detect edges from the preprocessed image.
Extract all the contours detected.
Finding the largest contour.
Forming a closed polygon in the form of Fractals from the largest closed contour.
saving pixel coordinates of the largest fractal.

The segmented sample weld joint are depicted in FIG. 4 FIG. 4A and FIG. 4B depicts the segmented beads of a straight and circular weld joint respectively using a dotted outline. These dotted lines are the largest fractals detected by the weld joint segmentation algorithm and are used to extract useful geometrical features of the detected weld joint. In FIG. 4B, the dark circular dots represent the detected centers and diametric end points of individual circular beads of the weld joint, that are used as reference points to calculate the geometric properties of the weld joint.

e) Extraction of useful geometrical features of the detected weld joint: From the pixel coordinates of the detected fractals of the weld joint, some useful geometrical parameters are extracted. The geometrical features which are extracted include:
a. Average Width of the Weld Joint: Width of the detected fractal is calculated by calculating the average width across 3 cross-sections of the detected weld joint.
Area of the Weld Joint: Area of the detected fractal in terms of pixel^2.
Perimeter of the Weld Joint: Perimeter of the detected fractal in terms of pixel.
Average Eccentricity of the Weld Joint: Eccentricity here, is termed as the deviation of the weld from the central line. 3 cross-sections of the detected weld joint is taken and averages of all the 3 cross-sections are returned as the final value of eccentricity.
Length of the Weld Joint: Length of detected fractal parallel to y-axis in terms of pixel.
Area: Perimeter Ratio: This perimeter is computed as a ratio of area and perimeter of the detected fractal.

f) Generation of Quality index: A quality index is generated based on the above extracted geometrical features for both good weld images as well as bad weld images. The quality index generated contains the values of each geometrical parameter for each of the weld joint instance. Each of the geometrical parameter present in the quality index indicates the quality of the weld joint. In a production line, there are always standard values (gold standard) for the geometrical parameter of the weld joint. If a weld joint has geometrical parameters ranging between these standard values then the weld joint is considered as acceptable (good weld quality). Anything outside the range of the standard values is considered as unaccepted (bad weld quality). In the system 100 disclosed herein, quality index generation leverages the principle based on comparison with gold standard that serves as the domain knowledge Each instance in the quality index contain the values for the specific geometrical parameters for all of the weld joints. Then this quality index serves as a domain knowledge input to the weld inspection model for training the inference system.

g) Encoding the Class Labels: The class labels for each of the entries in quality index are encoded into 0 or 1 denoting as bad weld or good weld.

h) Computing Domain Threshold Values: For each of the geometrical features whose label corresponds to the encoded value of "good weld" in the quality index, the minimum and maximum threshold values are computed. From the training dataset, for each of the weld joint type, threshold values, i.e., the values in which the geometrical parameters can range, are computed for each of the geometrical features, which then are used in membership functions in the inference system being used (DKI-ANFIS).

i) Domain Knowledge Infused ANFIS: As depicted in FIG. 2B, the layers of an ordinary ANFIS system are modified and infused with domain knowledge to give better results than other ANFIS systems even if there is a class imbalance in the data or the data is skewed or there is only a short corpus of data available.

Layer 1: This layer contains trainable parameters. The Membership function of an ordinary ANFIS is replaced with two different membership functions namely: Weld Good Membership Function and Weld Bad Membership Function.

The membership functions are of the shape "S" formed by two parabolas.

The membership functions are defined by:

1. Weld_Good_MF(x, max_good, min_good, a, y):

if min_good<=$x$<=max_good:

$x^2$=−4$ay$ else:

$x^2$=0

Here, 1>=y>=0.5 and "a" determines the width of the parabola.

In Layer 1, x is the weld joint geometrical parameter value a,b is the trainable parameter y is the directrix value for corresponding x value.

max_good is the max. value of a geometrical parameter to be considered as good/ideal min_good is the min. value of a geometrical parameter to be considered as good/idea 2. Weld_Bad_MF(x, max_good, min_good, b, y):

if $x$<min_good or $x$>max_good:

$x^2$=4$by$ else:

$x^2$=0

Here, 0.5>y>=0 and "b" determines the width of the parabola.

The modification in the membership function improves efficiency of the designed inference system and also reduces the computational cost, as the number of training parameters are lesser than conventional membership functions.

Layer 2: This layer is frozen and normalizes the weightage given to each parameter as per the domain knowledge.

$$D_i = \frac{(\mu A_i \times d_i)}{\mu A_i + d_i}$$

In Layer 2, $D_i$ is the output of domain infusion layer, $d_i$ is the domain introduced-bias value and $\mu A_i$ is output of membership function of layer 1.

Layer 3: Every node in this layer is a fixed node labeled π.

The output is the product of all the incoming signals.

$w_i = D_i(x1) \times D_i(x2)$

In Layer 3, wi is output of layer 3, fi is an adaptive node function and p, q, r are the parameters of fi.

Layer 4: Every node in this layer is a fixed node labeled N.

The $i^{th}$ node calculates the ratio of the $i^{th}$ rule's firing strength to the sum of all rule's firing strengths.

$$Wi = \frac{wi}{w1 + w2}, \text{ for } i = 1, 2$$

Wi is the normalized weight of geometric parameter value

Layer 5: Every node i in this layer is an adaptive node with a node function.

$W_i fi = W_i \times (p_i x + q_i y + r_i)$

Layer 6: The single node in this layer is a fixed node labeled sum, which computes a confidence score (an overall output score) as the summation of all incoming signals.

$$\text{Output} = \sum_{i=1}^{n} W_i f_i$$

Working of the layers:

In layer the crisp values of each of the geometrical features are passed onto the membership functions which will generate the rules for each of the geometrical parameters. There are 2 membership functions which we are using namely: Weld Good Membership Function and Weld Bad Membership Function.

In layer 2, a domain influence is added to the generated rules based on the domain knowledge.

In layer 3, the firing strength of the domain influenced rule is computed via a product operation.

In layer 4, the normalized firing strength of the rule is computed.

In layer 5, the result is generated with the help of a linear equation. The parameters of the equation are tuned by the learning algorithm of the neural network.

In layer-6, the defuzzification of the consequent parts of the rules are performed by summing the outputs of all the rules and a final output is generated.

Figure 3A:
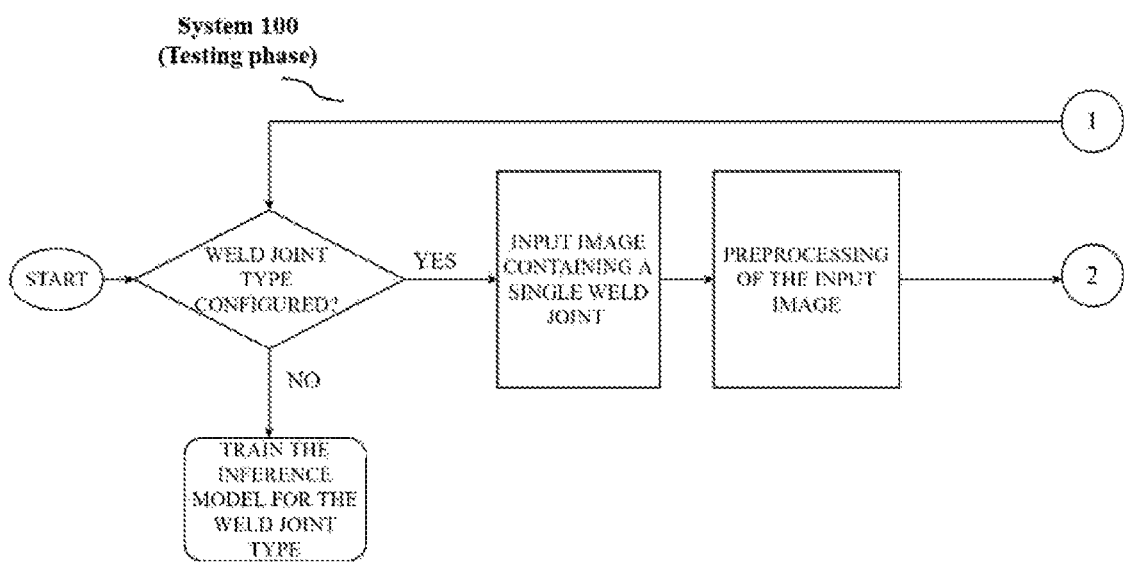
FIG. 3A and FIG. 3B illustrate the testing phase of the trained weld inspection model for weld quality inspection, of a weld inspection model of the system of FIG. 1, in accordance with some embodiments of the present disclosure.
Figure 3B:
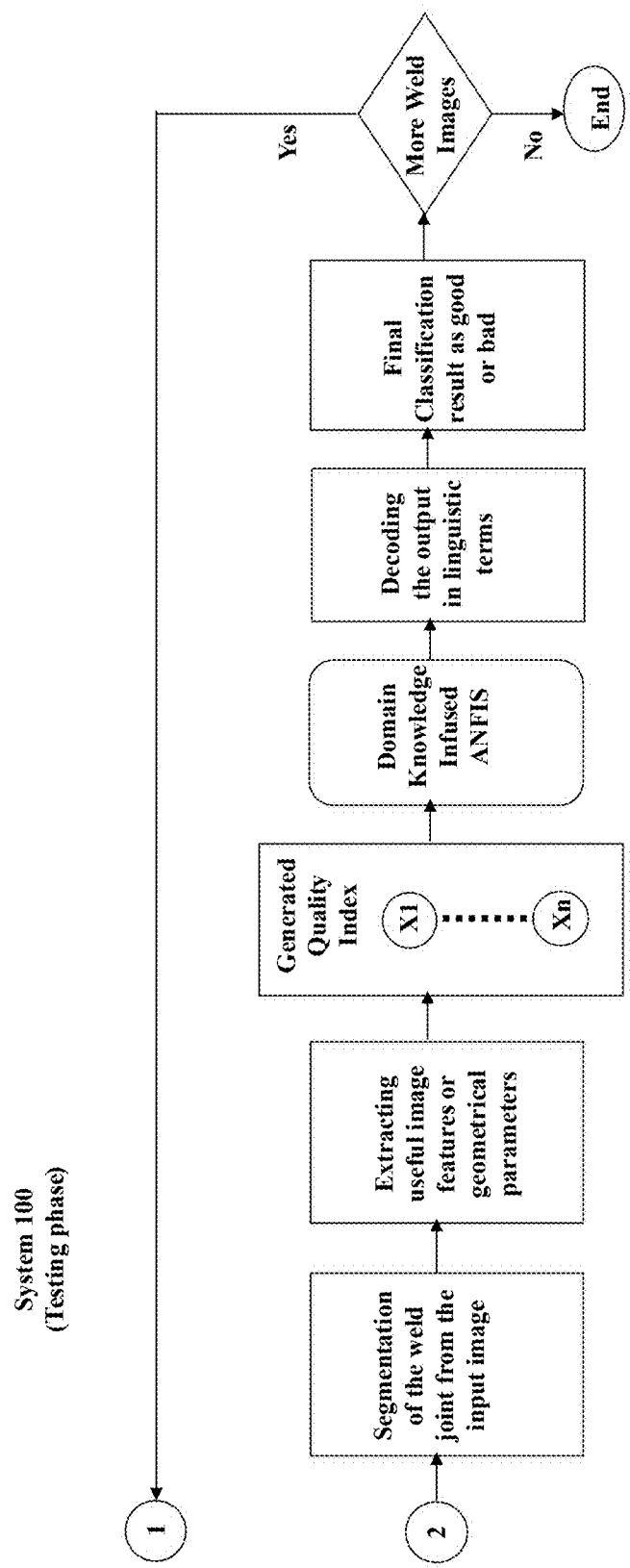

For example: If parameter x length is bad and width is good then weld quality is very good FIGS. 3A and FIG. 3B illustrate the testing phase or inferencing phase of the trained weld inspection model for weld quality inspection by the system of FIG. 1, in accordance with some embodiments of the present disclosure.

The steps for predicting weld joint quality of a test image received in the practical scenario (inferencing phase) or testing phase from an end user are listed below:
a) Check if the system 100 is configured and trained for the weld joint type to be tested for quality. If not, the weld inspection model is trained on the specific weld joint type.
b) An input image captured by any commodity device, is passed into the system 100.
c) Preprocessing: The input image is preprocessed to highlight the region of the image containing the weld joint and ignore other regions of the input image.
d) Segmentation: After the preprocessing of the input, the weld joint segmentation algorithm is used to segment the weld joint from the preprocessed image.
e) Extracting useful geometrical features: From the pixel coordinates of the detected fractals of the weld joint, some useful geometrical parameters are extracted.
f) Generating Quality Index: A quality index is generated from the extracted geometrical features.
g) Domain Knowledge Infused ANFIS: The generated quality index is passed on to the trained weld inspection model which is based on domain knowledge infused ANFIS to predict the overall quality of the weld joint.
h) Decoding Output to Linguistic Terms: The output generated from the weld inspection model is decoded in linguistic terms and a final output is generated indicating the quality of the weld joint to the end user.

Figure 5B:
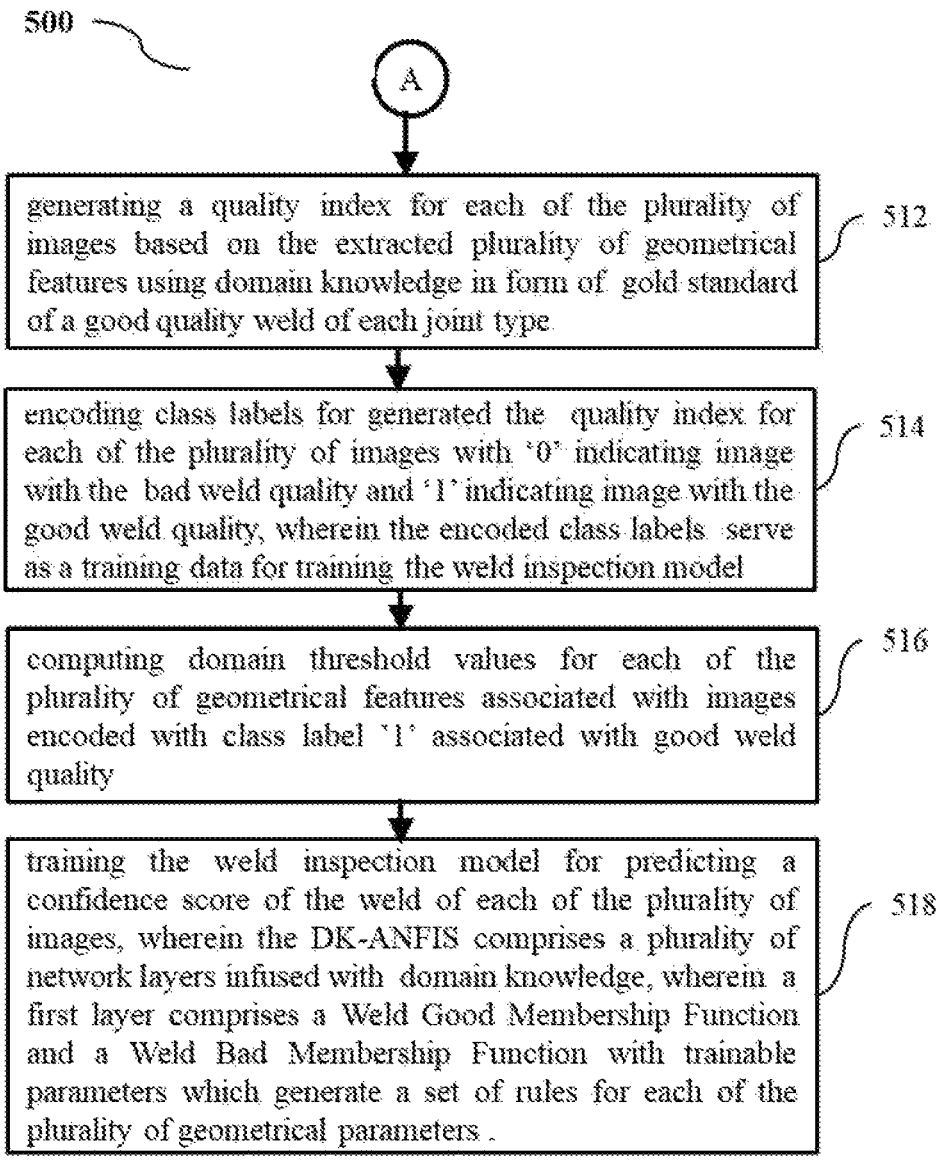

FIG. 5A and FIG. 5B illustrates a flow diagram of a method 500 for DKI-ANFIS based weld quality inspection, in accordance with some embodiments of the present disclosure. In an embodiment, the system 100 comprises one or more data storage devices or the memory 102 operatively coupled to the processor(s) 104 and is configured to store instructions for execution of steps of the method 500 by the processor(s) or one or more hardware processors 104. The steps of the method 500 of the present disclosure will now be explained with reference to the components or blocks of the system 100 as depicted in FIG. 1 and the steps of flow diagram as depicted in FIGS. 5A and 5B. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring to the steps of the method 500, at step 502, the one or more hardware processors 104 train the weld inspection model comprising the Domain Knowledge Infused Adaptive-Network-Based Fuzzy Inference System (DKI-ANFIS) for weld quality inspection to predict a confidence score of a weld of a joint type from among a set of joint types of interest, the training comprises steps 502a through 502i as described below.

Step 502a—Receiving a labeled set of a plurality of images with each of the plurality of images comprising the weld of the joint type from among the set of joint types of interest, wherein the plurality of images are labeled as a good quality weld and a bad quality weld. Unlike method in the art, the plurality of images utilized for training and testing (inferencing stage) are not constrained by lighting conditions and color formats. Regular images captured by common cameras in RGB format are also accepted to derive inference.

Step 502b—Configuring weightages to be assigned to each of a plurality of geometrical parameters for the weld of the one or more joint types. The weightages are one of (i) default with equal weightages across the plurality of geometrical parameters, and (ii) customized with varying values of the weightages across the plurality of geometrical parameters.

Step 502c—Preprocessing the plurality of images and marking a closed outline around the weld in each of the plurality of images.

Step 502d—Segmenting each of the preprocessed plurality of images to determine a plurality of fractals of the weld. The pixel coordinates of the largest fractal among the plurality of fractals are identified.

Step 502e—Extracting the plurality of geometrical features of the weld in accordance with the joint type using the pixel coordinates of the associated largest fractal and weighing the plurality of geometrical features of the weld in accordance with the configured weightages to introduce domain biases.

Step 502f—Generating a quality index for each of the plurality of images based on the extracted plurality of geometrical features using domain knowledge in form of gold standard of a good quality weld of each joint type.

Step 502g—Encoding class labels for generated the quality index for each of the plurality of ii ages with '0' indicating image with the bad weld quality and '1' indicating image with the good weld quality. The encoded class labels serve as a training data for training the weld inspection model;

Step 502h—Computing domain threshold values for each of the plurality of geometrical features associated with images encoded with class label '1' associated with good weld quality.

Step 502i—Training the weld inspection model comprising the DKI-ANFIS for predicting the confidence score of the weld of each of the plurality of images, wherein the DK-ANFIS comprises a plurality of network layers infused with domain knowledge, wherein a first layer comprises a Mid Good Membership Function and a Weld Bad Membership Function with trainable parameters which generate a set of rules for each of the plurality of geometrical parameters. Further network layers of the DKI-ANFIS comprise a second layer (layer 2), which is a frozen layer and normalizes weightages configured to each of the plurality of geometrical parameters, wherein a domain influence is added to the generated set of rules of the first layer based on the domain knowledge. A third layer (layer 3), wherein each node is a fixed node, generating an output which is product of all inputs to the third layer that computes a firing strength of the domain influenced set of rule. A fourth layer (layer 4) that normalizes the firing strength of the set of generated rules. A fifth layer (layer 5) generated a result from the normalized firing strength using a linear equation, wherein parameters of the equation are tuned by a learning algorithm of the fifth layer. A sixth layer is a single node to generate a final output by performing defuzzification of consequent parts of the set of rules by summing the outputs of the set of rules to predict the confidence score indicating the quality of the weld (weld joint) (for example, high score above a threshold indicative of good weld quality).

Further, once the weld inspection mode is trained, during inferencing or testing phase the trained weld inspection model can predict weld quality of a weld joint under inspection based on the extracted geometrical parameters and quality index from an input image of the weld joint. There are no constraints on image quality in terms of lighting conditions or specific color formats The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for weld quality inspection, the method comprising:
receiving, via one or ore hardware processors, a labeled set of a plurality of images with each of the plurality of images comprising a weld of a joint type from among a set of joint types of interest, wherein the plurality of images are labeled as a good quality weld and a bad quality weld;
configuring, via the one or more hardware processors, weightages to be assigned to each of a plurality of geometrical parameters for the weld of the one or more joint types, wherein the weightages are one of (i) default with equal weightages across the plurality of geometrical parameters, and (ii) customized with varying values of the weightages across the plurality of geometrical parameters;
preprocessing, via the one or more hardware processors, the plurality of images and marking a closed outline around the weld in each of the plurality of images;
segmenting, via the one or more hardware processors, each of the preprocessed plurality of images to determine a plurality of fractals of the weld, wherein pixel coordinates of the largest fractal among the plurality of fractals are identified;
extracting, via the one or more hardware processors, the plurality of geometrical features of the weld in accordance with the joint type using the pixel coordinates of the associated largest fractal and weighing the plurality of geometrical features of the weld in accordance with the configured weightages to introduce domain biases for joint types;
generating, via the one or more hardware processors, a quality index for each of the plurality of images based on the extracted plurality of geometrical features using domain knowledge in form of gold standard of a good quality weld of each joint type;

encoding, via the one or more hardware processors, class labels for generated the quality index for each of the plurality of images with '0' indicating image with the bad weld quality and '1' indicating image with the good weld quality, wherein the encoded class labels serve as a training data for training the weld inspection model;

computing, via the one or more hardware processors, domain threshold values for each of the plurality of geometrical features associated with images encoded with class label '1' associated with good weld quality; and training, a weld inspection model executed by the one or more hardware processors, for weld quality inspection to predict a confidence score of the weld of the joint type of each of the plurality of images comprising a Domain Knowledge Infused Adaptive-Network-Based Fuzzy Inference System (DKI-ANFIS), wherein the DKI-ANFIS comprises a plurality of network layers infused with domain knowledge, wherein a first layer comprises a Weld Good Membership Function and a Weld Bad Membership Function with trainable parameters which generate a set of rules for each of the plurality of geometrical parameters.

2. The processor implemented method of claim 1, wherein the trained weld inspection model is used during testing for prediction weld quality of a weld under inspection based on the extracted geometrical parameters and quality index from an input image of the weld.

3. The processor implemented method of claim 1, wherein the plurality of network layers of the DKI-ANFIS comprise:
a second layer, which is a frozen layer and normalizes weightages configured to each of the plurality of geometrical parameters, wherein a domain influence is added to the generated set of rules of the first layer based on the domain knowledge;
a third layer, wherein each node is a fixed node, generating an output which is product of all inputs to the third layer that computes a firing strength of the domain influenced set of rule;
a fourth layer that normalizes the firing strength of the set of generated rules;
a fifth layer generated a result from the normalized firing strength using a linear equation, wherein parameters of the equation are tuned by a learning algorithm of the fifth layer; and
a sixth layer is a single node to generate a final output by performing defuzzification of consequent parts of the set of rules by summing the outputs of the set of rules to predict the confidence score indicating the quality of the weld.

4. The processor implemented method of claim 1, wherein the plurality of images utilized for training and testing are not constrained by lighting conditions and color formats.

5. A system for weld quality inspection, the system 100 comprising:
a memory storing instructions;
one or more Input/Output (110) interfaces; and
one or more hardware processors coupled to the memory via the one or more I/O interfaces, wherein the one or more hardware processors are configured by the instructions to:
receive a labeled set of a plurality of images with each of the plurality of images comprising a weld of a joint type from among a set of joint types of interest, wherein the plurality of images are labeled as a good quality weld and a bad quality weld;
configure weightages to be assigned to each of a plurality of geometrical parameters for the weld of the one or more joint types, wherein the weightages are one of (i) default with equal weightages across the plurality of geometrical parameters, and (ii) customized with varying values of the weightages across the plurality of geometrical parameters;
preprocess the plurality of images and marking a closed outline around the weld in each of the plurality of images;
segment each of the preprocessed plurality of images to determine a plurality of fractals of the weld, wherein pixel coordinates of the largest fractal among the plurality of fractals are identified;
extract the plurality of geometrical features of the weld in accordance with the joint type using the pixel coordinates of the associated largest fractal and weighing the plurality of geometrical features of the weld in accordance with the configured weightages to introduce domain biases for joint types;
generate a quality index for each of the plurality of images based on the extracted plurality of geometrical features using domain knowledge in form of gold standard of a good quality weld of each joint type;
encode class labels for generated the quality index for each of the plurality of images with '0' indicating image with the bad weld quality and '1' indicating image with the good weld quality, wherein the encoded class labels serve as a training data for training the weld inspection model;
compute domain threshold values for each of the plurality of geometrical features associated with images encoded with class label '1' associated with good weld quality; and
train a weld inspection model executed by the one or more hardware processors, for weld quality inspection to predict a confidence score of the weld of the joint type of each of the plurality of images comprising a Domain Knowledge Infused Adaptive-Network-Based Fuzzy Inference System (DKI-ANFIS), wherein the DKI-ANFIS comprises a plurality of network layers infused with domain knowledge, wherein a first layer comprises a Weld Good Membership Function and a Weld Bad Membership Function with trainable parameters which generate a set of rules for each of the plurality of geometrical parameters.

6. The system of claim 5, wherein the trained weld inspection model is used during testing for prediction of weld quality of a weld under inspection based on the extracted geometrical parameters and quality index from an input image of the weld.

7. The system of claim 5, wherein the plurality of network layers of the DKI-ANFIS comprise:
a second layer, which is a frozen layer and normalizes weightages configured to each of the plurality of geometrical parameters, wherein a domain influence is added to the generated set of rules of the first layer based on the domain knowledge;
a third layer, wherein each node is a fixed node, generating an output which is product of all inputs to the third layer that computes a firing strength of the domain influenced set of rule;
a fourth layer that normalizes the firing strength of the set of generated rules;

a fifth layer generated a result from the normalized firing strength using a linear equation, wherein parameters of the equation are tuned by a learning algorithm of the fifth layer; and a sixth layer is a single node to generate a final output by performing defuzzification of consequent parts of the set of rules by summing the outputs of the set of rules to predict the confidence score indicating the quality of the weld.

8. The system of claim 5, wherein the plurality of images utilized for training and testing are not constrained by lighting conditions and color formats.

9. One or more non-transitory machine-readable information storage mediums comprising one or more instructions which when executed by one or more hardware processors cause:

receiving a labeled set of a plurality of images with each of the plurality of images comprising a weld of a joint type from among a set of joint types of interest, wherein the plurality of images are labeled as a good quality weld and a bad quality weld;

configuring weightages to be assigned to each of a plurality of geometrical parameters for the weld of the one or more joint types, wherein the weightages are one of (i) default with equal weightages across the plurality of geometrical parameters, and (ii) customized with varying values of the weightages across the plurality of geometrical parameters;

preprocessing the plurality of images and marking a closed outline around the weld in each of the plurality of images;

segmenting each of the preprocessed plurality of images to determine a plurality of fractals of the weld, wherein pixel coordinates of the largest fractal among the plurality of fractals are identified;

extracting the plurality of geometrical features of the weld in accordance with the joint type using the pixel coordinates of the associated largest fractal and weighing the plurality of geometrical features of the weld in accordance with the configured weightages to introduce domain biases for joint types;

generating a quality index for each of the plurality of images based on the extracted plurality of geometrical features using domain knowledge in form of gold standard of a good quality weld of each joint type;

encoding class labels for generated the quality index for each of the plurality of images with '0' indicating image with the bad weld quality and '1' indicating image with the good weld quality, wherein the encoded class labels serve as a training data for training the weld inspection model;

computing domain threshold values for each of the plurality of geometrical features associated with images encoded with class label '1' associated with good weld quality; and training, a weld inspection model executed by the one or more hardware processors, for weld quality inspection to predict a confidence score of the weld of the joint type of each of the plurality of images comprising a Domain Knowledge Infused Adaptive-Network-Based Fuzzy Inference System (DKI-ANFIS), wherein the DKI-ANFIS comprises a plurality of network layers infused with domain knowledge, wherein a first layer comprises a Weld Good Membership Function and a Weld Bad Membership Function with trainable parameters which generate a set of rules for each of the plurality of geometrical parameters.

10. The one or more non-transitory machine-readable information storage mediums of claim 9, wherein the trained weld inspection model is used during testing for prediction weld quality of a weld under inspection based on the extracted geometrical parameters and quality index from an input image of the weld.

11. The one or more non-transitory machine-readable information storage mediums of claim 9, wherein the plurality of network layers of the DKI-ANFIS comprise:

a second layer, which is a frozen layer and normalizes weightages configured to each of the plurality of geometrical parameters, wherein a domain influence is added to the generated set of rules of the first layer based on the domain knowledge;

a third layer, wherein each node is a fixed node, generating an output which is product of all inputs to the third layer that computes a firing strength of the domain influenced set of rule;

a fourth layer that normalizes the firing strength of the set of generated rules;

a fifth layer generated a result from the normalized firing strength using a linear equation, wherein parameters of the equation are tuned by a learning algorithm of the fifth layer; and a sixth layer is a single node to generate a final output by performing defuzzification of consequent parts of the set of rules by summing the outputs of the set of rules to predict the confidence score indicating the quality of the weld.

12. The one or more non-transitory machine-readable information storage mediums of claim 9, wherein the plurality of images utilized for training and testing are not constrained by lighting conditions and color formats.

* * * * *